Nov. 19, 1957 W. M. UNDERWOOD 2,813,301
SHEETING DIE
Filed Dec. 13, 1954
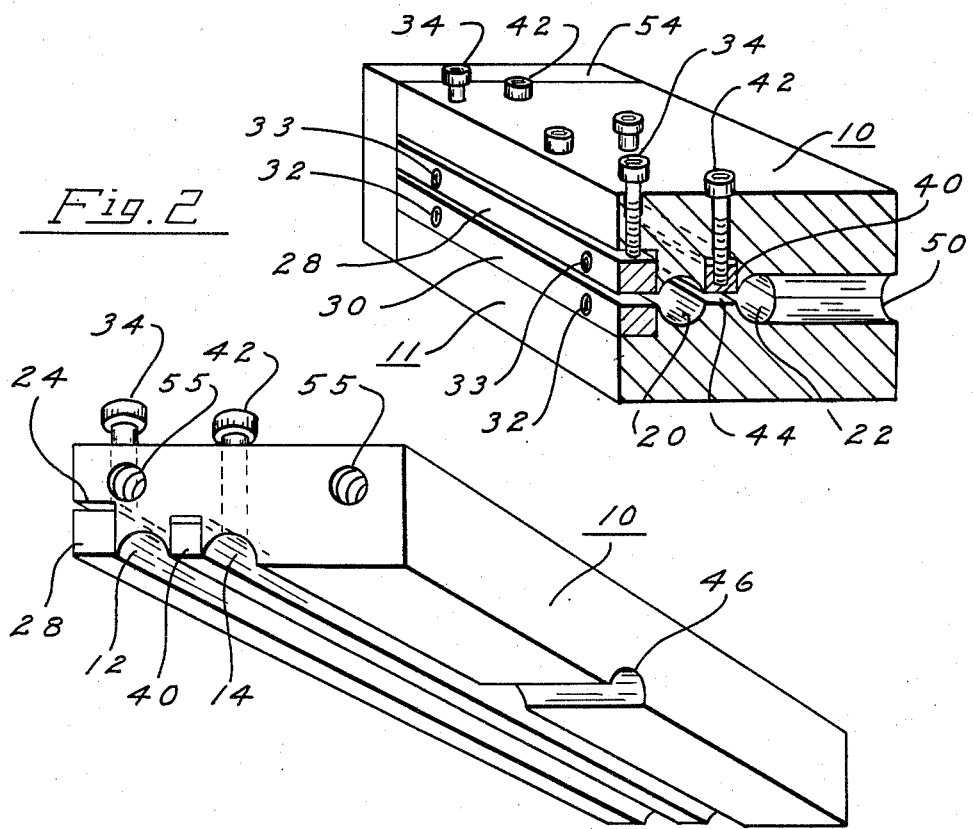
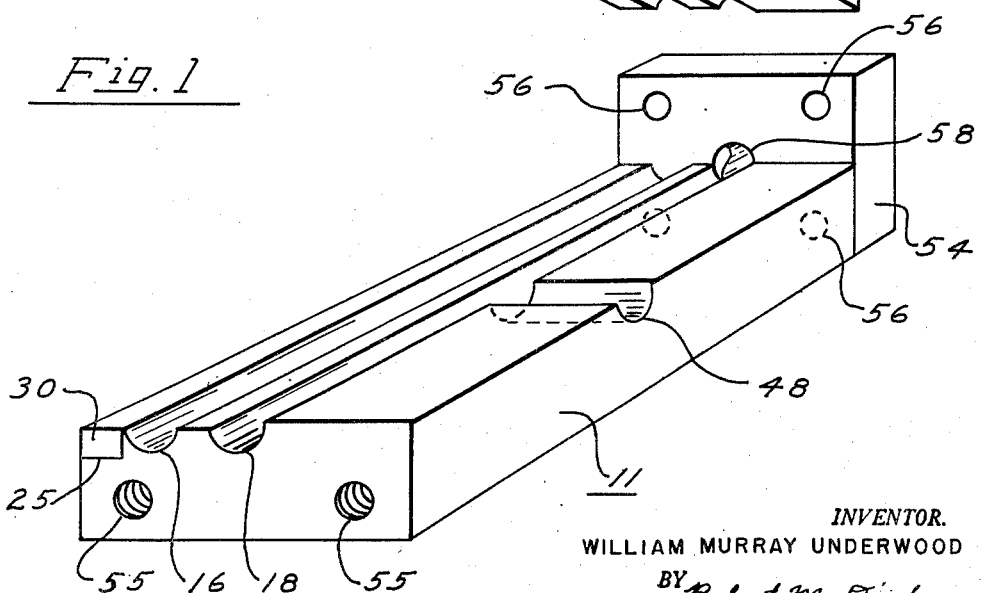
INVENTOR.
WILLIAM MURRAY UNDERWOOD
BY Robert M. Dickey
ATTORNEY

2,813,301

SHEETING DIE

William Murray Underwood, Springfield, Mass., assignor to Monsanto Chemical Company, St. Louis, Mo., a corporation of Delaware Application December 13, 1954, Serial No. 474,641

5 Claims. (Cl. 18—12)

This invention relates to a sheet extrusion die. More particularly the invention relates to a sheet extrusion die designed to produce an accurately dimensioned sheet of plastic by extrusion thereof through said die under heat and pressure.

A major problem in the production of continuous plastic sheets by extrusion under heat and pressure is the transformation of the plastic from a substantially round rod as it leaves the extruder to a flat accurately dimensioned sheet as it leaves the die. Due to the nature of plastic flow it is extremely difficult to prevent channelling of the plastic material which results in uneven flow through the die.

One object of this invention is to provide a new sheet extrusion die.

A further object is to provide a sheet extrusion die designed to produce accurately dimensioned continuous sheets.

These and other objects are attained by providing a die having dual material chambers as set forth below and shown in the drawings in which, Fig. 1 is an exploded elevation in perspective and Fig. 2 is a front plan view partly in section.

With reference to the drawings, blocks 10 and 11 represent the top and bottom halves respectively of an extrusion die made according to this invention. In the underside of block 10 are two generally semicircular channels 12 and 14 running the full length of block 10. In the top of block 11 are two semicircular channels 16 and 18 running the full length of block 11. When blocks 10 and 11 are superimposed for extrusion purposes, channels 12 and 16 define a primary material chamber 20 and channels 14 and 18 define a secondary material chamber 22 as shown in cross section in Fig. 2.

Forwardly of channels 12 and 16, blocks 10 and 11 are cut away as at 24 and 25 and die lips 28 and 30 are mounted, respectively, in the cutaway portions. Both die lips 28 and 30 may be adjustably mounted or one may be made stationary and the other adjustable. As shown in the drawings die lip 30 is stationary and held immovable in place by suitable means such as set screws 32. Die lip 28 is movable in a vertical direction to adjust the distance between it and die lip 30 and thereby control the width of the die aperture. The adjustment of die lip 28 may be accomplished by any suitable means such as a series of push-pull jacks 34. After the lip has been adjusted it may be prevented from further movement by suitable means such as set screws 33.

Intermediate between channels 12 and 14 in block 10 is a flexible separator bar 40 which may be adjusted vertically by any suitable means such as push-pull jacks 42 to define and control the aperture 44 between material chambers 20 and 22 when the die is closed. The bar is flexible so that it may be bowed in the middle or at the ends as required to properly define the aperture.

Rearwardly of channels 14 and 18 and centrally positioned relative thereto are channels 46 and 48 which define a material inlet 50 when the die is closed.

Positioned at each end of blocks 10 and 11 are end closure blocks such as blocks 54. The end closure blocks are fastened to blocks 10 and 11 by suitable means such as bolts (not shown) passing through holes 56 and threaded into suitable recesses 55 in the ends of blocks 10 and 11. The end closure blocks serve to define the longitudinal ends of material chambers 20 and 22 and to hold blocks 10 and 11 in cooperating alignment during the extrusion operation. Advantageously end closure blocks 54 are fitted with contoured plugs such as plug 58 which further define the ends of secondary material chamber 22 to control the flow pattern of the material being shaped. Such plug 58 is shown with a forwardly curved end surface fitting into chamber 22.

In operation, blocks 10 and 11 are superimposed, end closure blocks 54 are positioned thereon and tightly secured thereto. The closed die in then mounted on an extruder (not shown) with channel 50 cooperatively engaged with the orifice of the extruder. Bar 40 is raised by means of jacks 42 and die lip 28 is adjusted to the desired opening by means of jacks 34. Material is then fed from the extruder through channel 50 into secondary material chamber 22. Since the aperture 44 between chambers 22 and 20 is constricted relative to the size of the chambers even when bar 40 is raised, the extruding material quickly fills secondary material chamber 22, flows through aperture 44 into primary material chamber 20, fills said chamber 20 and starts to flow between die lips 28 and 30. As soon as material begins to emerge from the die, bar 40 is lowered to further constrict aperture 44. Once bar 40 and die lip 28 are properly adjusted, a continuous accurately dimensioned sheet is obtained.

For most plastic materials it is essential to have a heated die. This may be accomplished with the die of this invention by any suitable means not shown such as electric bar heaters spaced along the broad top and bottom surfaces of blocks 10 and 11, by boring blocks 10 and 11 to permit circulation of hot liquids, etc.

Many variations may be made in the design of the die set forth in the drawings without departing from the spirit and scope of this invention.

For example, channel 50 may be closed by a plug or other suitable means and the material to be shaped may be introduced into chamber 22 through the opening in end closure block 54 obtained by removing plug 58 therefrom.

The shape of chambers 20 and 22 may be round, elliptical, rectangular, etc. However, it is essential that primary chamber 20 be co-extensive with the die lips and the aperture defined thereby and that secondary chamber 22 be co-extensive with the primary chamber 20. It is not necessary that primary and secondary chambers have the same cross section, e. g. chamber 22 may be round and 20 may be elliptical, or both chambers may be round but one may be larger than the other, etc.

Among other variations, the die may be made of a single block of material with the two chambers and apertures being machined out of the block, the chambers may terminate short of the ends of the die block thus avoiding the necessity for end closure blocks, the adjustable bar may be inserted in the bottom half of the die or there may be adjustable bars in both the top and the bottom of the die.

What is claimed is:

1. A sheet extrusion die, comprising adjustable die lips, a primary material chamber co-extensive with said die lips and having an aperture therein cooperating with said die lips to define an extrusion orifice, a secondary material chamber positioned rearwardly from said primary material chamber and co-extensive therewith, an adjustable aperture defining a constricted passage between said secondary material chamber and said primary material chamber and means for introducing an extrudable material into said secondary material chamber.

2. A sheet extrusion die as in claim 1 wherein both primary and secondary material chambers are generally circular in cross section.

3. A sheet extrusion die as in claim 1 wherein the ends of both primary and secondary material chambers are defined by end closure blocks.

4. A sheet extrusion die as in claim 3 wherein the ends of the secondary material chamber are defined by contoured plugs inserted in said end closure blocks, said contoured plugs producing a forwardly curved end surface.

5. A sheet extrusion die as in claim 1 wherein the aperture between the material chambers is defined by means of an adjustable flexible separator bar.

References Cited in the file of this patent
UNITED STATES PATENTS 2,628,386     Tornberg            Feb. 17, 1953

FOREIGN PATENTS 508,298     Belgian Patent        Jan. 31, 1952
(Corresponding U. S., Wienand, 2,696,640, Dec. 14, 1954.)